United States Patent [19]
Dufour

[11] 3,907,310
[45] Sept. 23, 1975

[54] FLOATING SEAL CONSTRUCTION

[75] Inventor: Raymond James Dufour, Wheaton, Ill.

[73] Assignee: Gas Developments Corporation, Chicago, Ill.

[22] Filed: Aug. 22, 1973

[21] Appl. No.: 390,432

Related U.S. Application Data

[63] Continuation of Ser. No. 118,641, Feb. 25, 1971, abandoned.

[52] U.S. Cl. ................ 277/92; 277/173; 277/226; 277/95; 165/9
[51] Int. Cl. ............................................. F16j 15/38
[58] Field of Search ............ 277/173, 226, 34, 34.3, 277/92, 175, 178, 160, 95; 165/9

[56] References Cited
UNITED STATES PATENTS

| | | | |
|---|---|---|---|
| 2,181,203 | 11/1939 | Reynolds | 277/182 X |
| 2,590,288 | 3/1952 | Breyfogle et al. | 277/85 X |
| 2,894,635 | 7/1959 | Irthom et al. | 277/226 X |
| 3,408,083 | 10/1968 | Szymanski | 277/34 |
| 3,443,845 | 5/1969 | Walche et al. | 277/227 X |
| 3,501,246 | 3/1970 | Hickey | 277/160 X |

FOREIGN PATENTS OR APPLICATIONS

| | | | |
|---|---|---|---|
| 72,030 | 10/1959 | France | 277/92 |

Primary Examiner—Samuel B. Rothberg
Attorney, Agent, or Firm—Molinare, Allegretti, Newitt & Witcoff

[57] ABSTRACT

Improved floating seal constructions for use in conjunction with rotary regenerative devices involved in fluid handling apparatus, more specifically for rotary regenerative heat and moisture exchangers useful in environmental air conditioning units, dryers and the like. Specific embodiments involve use of a silicone rubber flexure member carrying a Teflon rubbing strip or a floating radial T-bar having Teflon rubbing buttons. Another embodiment employs a ribbon bow spring as the flexure member, and is particularly useful for high temperature operations.

5 Claims, 12 Drawing Figures

INVENTOR.
RAYMOND JAMES DUFOUR
BY
Molinare, Allegretti, Newitt & Witcoff
ATTORNEYS INVENTOR.
RAYMOND JAMES DUFOUR
BY
Molinare, Allegretti, Newitt & Witcoff
ATTORNEYS

FLOATING SEAL CONSTRUCTION

This is a continuation of application Ser. No. 118,641, filed Feb. 25, 1971, now abandoned.

BACKGROUND

Many fluid handling processes, and specifically those employing air, gases and the like, involve the use of rotary exchangers of one type or another. Principal among these are rotary heat or vapor exchanging devices of the continuously regenerated type. Principal vapors include water vapor (moisture) and organics. This class of device is also useful in the separation of one gas from another, for example, removal of $CO_2$ from closed environmental systems such as submarine atmospheres, space craft and the like for regeneration of the air for use by the occupants therein.

Generally, these rotary regenerative exchangers involve the use of a drum or wheel of exchange material which is mounted for rotation on an axle or by peripheral gears on its casing. Typically, these wheels are a cylindrical section having a hub on a centrally mounted axle and exterior annular retaining shell. Supported between the central hub and the shell is the exchange material having holes oriented parallel to the axis therethrough. The exchange material may be a corrugated asbestos type of material, strengthened by impregnation with sodium silicate. Other exchange materials include: (1) ceramic, such as "Cercor" and the like, (2) glass or metal fibrous material such as fiberglass, glass wool or metal wool, (3) corrugated or expanded metal such as corrugated or expanded steel or aluminum, and (4) paper, strengthened with resins such as phenol formaldehyde resins or the like. Typical absorbents or adsorbents include lithium chloride, zeolites, potassium carbonates and the like.

Typical uses for such types of wheels involve the rotary regenerative heat exchangers involved in gas fired appliances, such as the self-cleaning gas stove shown in U.S. Pat. No. 3,416,509, incinerators, as shown in U.S. Pat. No. 3,509,834, dryer cores as shown in U.S. Pat. No. 3,155,153, and in the so-called Munters environmental control machine such as shown in U.S. Pat. No. 2,993,563, 3,009,540 and 3,125,157.

The early use of rotary regenerative exchangers, such as heat exchangers, required precision construction of both the housing within which the wheel rotated, and the wheel itself. In addition, the wheel had to be mounted extremely precisely on the axle. These requirements arose because short circuiting would ruin the efficiency of these wheels. Short circuiting is the term applied to the situation where the fluid escapes from one stream directly into the other without passing through the wheel. For example, air passing through an environmental control unit on the input side of the wheel during the absorption half of the cycle operates at a substantially different pressure or velocity than the air passing through the other half of the wheel in the opposite direction during the regeneration half of cyle. In addition, the tempratures of the air flowing through the different segments of the wheel is different. Escape or short circuiting of the air from one portion of the wheel across the face of the wheel into the stream of gas exiting from the other half of the wheel casues a significant loss in efficiency of these wheels. In addition, in such operations as the removal of $CO_2$ from air, escape of $CO_2$ laden air into the recirculation stream would make the device impractical.

Therefore, the wheels were made extremely precise and the ducting within the housing in which the wheel was disposed was precisely adjusted so that it approached within a few tenths or hundedths of an inch from the face. Only small deviations from the permitted tolerances were possible since axial misalignment or out-of-roundness of the wheel would cause excessive short circuiting. To provide such precise spacing of the wheels was time consuming and extremely difficult to achieve. In addition, the expense of precise machine tolerances, alignment of the axes and bearings, frequent checking and readjustment of the baffles and seals put severe limitations on the use of such regenerative wheels.

In addition to the above problems relating to these seals on the face of the wheels, the wheels also required sealing around the periphery so that there was likewise no escape of gases. The problems encountered here were out-of-roundness of the wheels in addition to the axial misalignment or cocking of the plane of the wheel. Further, high temperature operation, on the order of 325°F. gives rise to special seal requirements such as non-flammability, non-deterioration and the like which prevent the use of conventional seal materials.

One solution to the problem of precision mounting of the wheels is shown in U.S. Pat. No. 3,416,509. There, a roll-type of rubbing seal was used to contact the face of the rotating heat exchange wheel. The roll-type of material used was fiberglass, and it contacted and rubbed against the asbestos, ceramic or sodium silicate-impregnated wheel. However, these types of seals cause abrasion both of the seal and of the wheel material. The former is particularly severe where the wheel material is made of metal, such as corrugated steel. In addition, in the applications where the wheel material is relatively soft, for example in the moisture transferring L-wheels of the Munters environmental control units, the relatively harder seal material would severely abrade the face of the wheels. The abrasion causes uneven gaps and increased short circuiting across the face of the wheel. Such abrasion also tends to fill the relatively small axial channels with the abraded wheel material, thus causing increase in the air flow resistance (increased pressure drop) and eventual plugging of the wheels, leading to failure of the machines. Roll-type or brush-type seals also tend to lift away from the wheel face due to pressure differentials, thus permitting excessive short circuiting.

While certain applications will permit the extrmely expensive, precise machining and custom installation, the expanding areas of use of wheels will not permit such expenses. For example, the use of wheels in home appliances such as in the self-cleaning gas-fired oven or home incinerators, and in the air conditioners of the Munters environmental control unit type involved the use of sheet metal ducting, and heavy-gage, but not machinable, wheel hubs and outer rims. Necessarily, such construction cannot be made as precise as machined castings, and must allow for considerable tolerances for out-of-roundness, axial wobble, and location decrepancies. Thus, the sealing problem has been accentuated rather then diminished by the attempts to successfully adapt such wheels to use in home appliances, air conditioners and the like.

THE INVENTION

Objects

It is an object of this invention to provide specially adapted floating seals in conjunction with such types of regenerators.

It is another object of this invention to provide a simple, yet precise seal which permits minimum short circuiting across the face of such type of regenerator wheels without the necessity of precision castings or continuous precision adjustment and maintenance, under conditions including high temperatures.

It is another object of this invention to provide a specially adapted peripheral seal which prevents fluid loss or short circuiting by a relatively friction-free contact seal which floats and adjusts to axial misalignment and out-of-roundness of such regenerative wheels.

It is another object of this invention to provide a floating type of face seal which maintains a substantially constant yet minimal clearance from the face of such types of regenerators thereby substantially preventing increase in short circuiting during the lifetime of the operation of such regenerator, and which is simple of construction and maintenance while compensating for axial misalignment or out-of-roundness of such types of regenerator wheels.

These and other objects of the invention will be more evident from the full description which follows.

SUMMARY

The objects of this invention are achieved by providing a special type of floating seal having an axial distance-compensating member and a sealing member. In one embodiment, the distance-compensating member is of rubber or plastic and includes: a base portion of securing or retaining the seal in or to a channel, wall, duct or the like; a flexible, intermediate web portion projecting from the base; and specially adapted flange portion for gripping and retaining the sealing member therein. In another embodiment, the distance-compensating member may be a ribbon-like bow-spring. This embodiment is especially useful for high temperature operating environments.

The sealing member may be of several types. In one embodiment, the sealing member is a strip of low-friction material, such as Teflon adapted to contact a flange of a rotating wheel. Typical dimensions are 1/8 inch thick and 7/8 inch wide. In another embodiment, the sealing member is a rigid bar having at spaced portions therealong low-friction flange-contacting inserts which space the bar from the face of the rotating wheel. By this construction, a substantially constant, yet small and precisely predetermined distance of the sealing member from the face of the wheel may be continuously maintained. The intermediate flexing web or bow spring is able to continuously compensate for axial misalignment, while the width of the flange in contact with the sealing member compensates for radial out-of-roundness of the wheel.

The more detailed description which follows is by way of illustration and not by way of limitation of the principles of the invention, and reference therein will be had to the Figures wherein the same or like parts are identified with the same numerals throughout.

THE FIGURES

DETAILED DESCRIPTION

Figure 1:
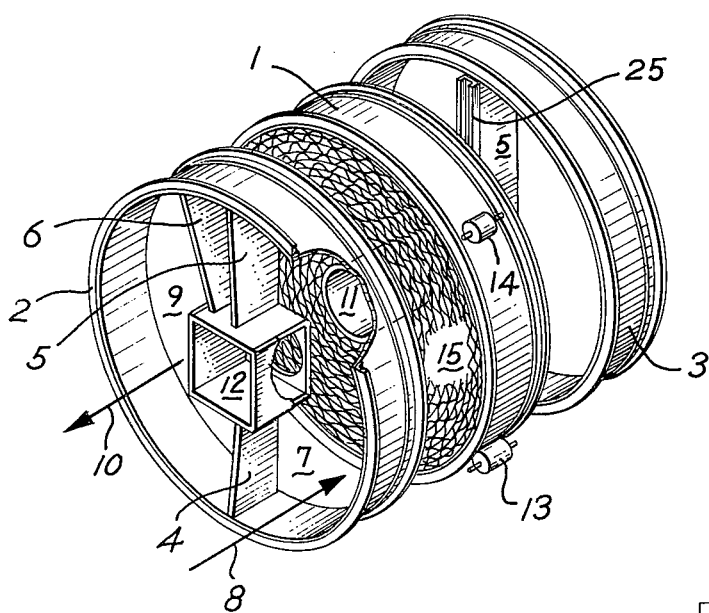
FIG. 1 shows a perspective, exploded view of a typical rotary exchanger assembly, particularly adapted for use in an environmental control air conditioning type of device, utilizing one or more rotary exchanger wheels.

FIG. 1 shows an assembly of a regenerator wheel 1 in position between duct sections 2 and 3. Particular reference herein will be made to an environmental control unit or air conditioner, but it should be understood that this is merely illustrative and the same principles may apply to regenerators used in $CO_2$ removal, heat exchange as in a gas-fired appliance and the like. The wheel may be divided into a plurality of sections by use of baffles 4, 5 and 6 such as inlet section 7 through which incoming air 8 passes, and outlet or exhaust section 9 through which exhaust gases 10 pass. The central section 11 may be used either for mounting axles, as a bypass air duct, or the like, with baffle assembly 12 in outer duct section 2 adapted for the appropriate purpose. The regenerator wheel may be rotated by power driven wheel 13, and guided by wheel 14. The drive may also be axial, or by an external gear ring assembly as necessary or desired. The regenerator wheel itself is made up of a material 15 which has air flow passages therethrough, and which may be treated for the desired purpose, such as for hygroscopicity, fire resistance, or the like. For purposes of discussion, it is assumed that the wheel material 15 is made up of a corrugated asbestos material having axial passages 16 (see FIG. 2) therethrough. The wheel 1 and the two duct sections 2 and 3 are disposed within an appropriate housing defined by walls 17 and 18 (see FIG. 2).

Figure 2:
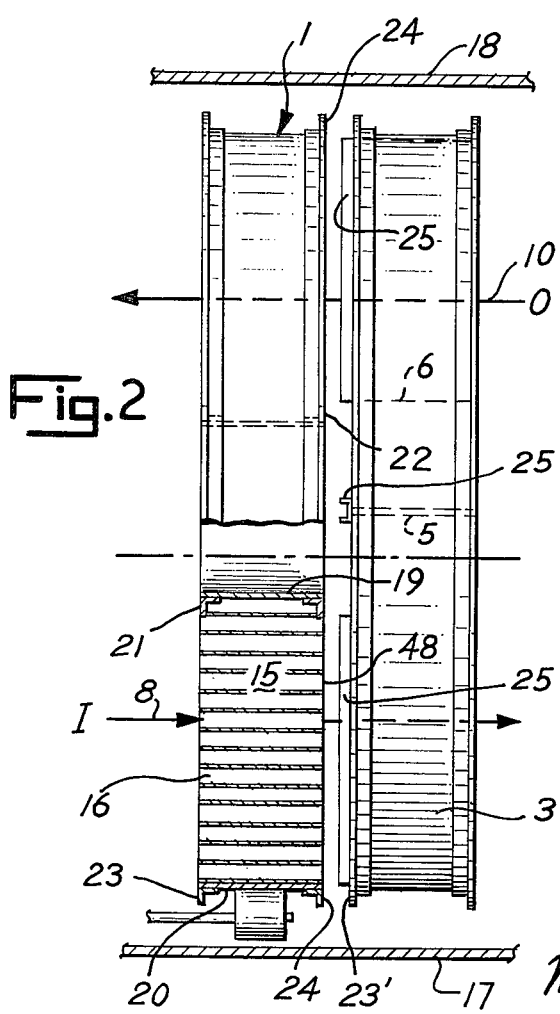
FIG. 2 is a side view, partly in section, of a wheel and adjacent duct assembly showing relationships of support parts for the seals.

FIG. 2 shows in more detail the juxtaposed assembly of the regenerator wheel 1 and the inner duct section 3. The lower half of regenerator wheel 1 is shown in section, and comprises the wheel material 15 disposed within an inner ring or hub 19 and an outer ring or rim 20. The hub has annular flanges 21 and 22 thereon which operate as contact surfaces for the sealing member as described in more detail below. Likewise, the rim has flanges 23, 24 which also serve as contact surfaces. These flanges may be integral portions of the hub and rim, respectively, or may be separate pieces secured to the rim and hub, respectively. For example, the rim module 20 may be formed from a single sheet of 18 gage aluminum or sheet metal with a diameter of 3 to 4 feet. In the alternative, the module may be formed from a cylindrical section, with flanges 23, 24 being angle stock secured thereto by fasteners, welds or the like.

The inner duct section 3 is similarly constructed. This permits the entire assembly to be modular in nature, the major difference between the section 1 and section 3 being that the section 1 contains the wheel material. Secured to the wheel facing side of duct section 3 is a U-shaped channel 25 which radially spans the distance between the hub and the rim of duct section 3. This serves two purposes, the first being to support and properly space the hub from the rim, and the second to act as a radial seal strut as described in more detail below. The U-shaped channel seal strut is disposed in a position corresponding to the desired air flow path through the wheel, and may also be attached to a baffle, such as baffle 4, 5 or 6 (see FIG. 8). While only one channel is shown in FIG. 2, it should be understood that a plurality of these struts may be employed, and they may span the entire diameter, a radial section, or a cord section of the wheel. Although the U-shaped channel is shown for purposes of illustration, it should be understood that flat stock having means for securing thereto or retaining the flexible member may also be employed.

Figure 3:
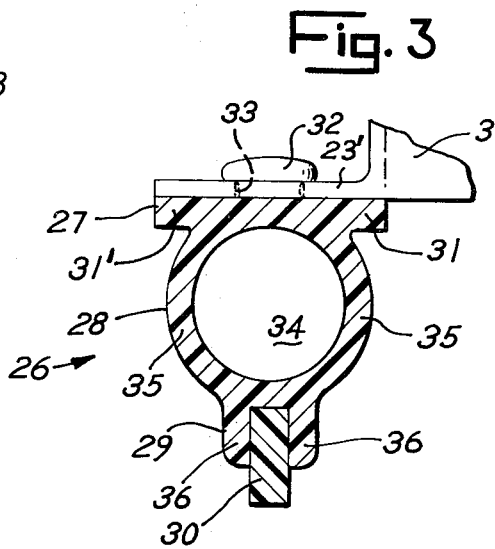
FIG. 3 shows in section one embodiment of a peripheral seal in accordance with this invention.

FIG. 3 illustrates one configuration for a peripheral seal secured to the annular flange 23' on the rim of the duct section 3. The peripheral seal 26 comprises a base portion 27, an intermediate portion 28, a flange portion 29 and a sealing member 30. The base portion 27 is generally enlarged for securing to the annular flange 23' as for example by adhesive, fasteners passing through the wings 31, 31' or an enlarged grommetlike member 32 passing through an aperture 33 in the annular flange 23'. The intermediate web portion 28 is shown generally cylindrical with a hollow center portion 34 which may or may not be sealed at the ends depending on the desired degree of flex. The webbing 35 may also be dimensioned thick or thin depending on whether large or small flex resistance is desired. The flange portion 29 comprises two lips 36, 36' which are adapted to grip sealing member 30 therein. Typically, the base, web and flange of the peripheral seal may be made of a rubber material, such as silicone rubber, plastic such as vinyl, polyethylene, polypropylene, urethane, or the like. Silicone rubber is particularly useful for relatively high temperature operations up to about 400°F. The sealing member may be of any material having relatively friction-free characteristics, such as "Teflon", "Kel-F", polyethylene or the like. Teflon is a polytetrafluorethylene, while Kel-F is a chlorotrifluorethylene polymer. Either of these polymers may be copolymerized with compatible materials such as vinylidene flouride and the like.

Figure 4:
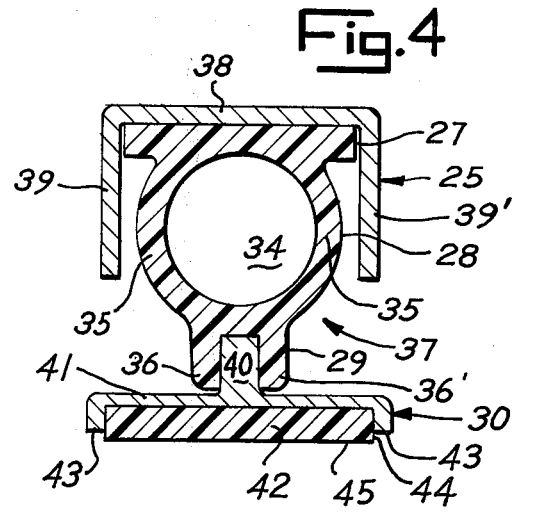
FIG. 4 shows in section one embodiment of a radial seal in accordance with this invention.

FIG. 4 shows the radial seal 37 which may have the generally similar configuration and composition as the similarly numbered parts indicate. This seal is disposed within a U-shaped channel 25 which has base portion 38 and arms 39, 39'. The arms serve to retain sidewise motion of the distance-compensating member, here the rubber assembly 37, within the channel due to forces imparted thereon by any off-axis or out-of-roundness of the rotating regenerator wheel. The sealing member 30 is specially adapted with rib 40 being adapted to be gripped by the lips 36, 36', and having at substantially right angles thereto a flat plate 41 of substantial width as compared with the rib 40. Plate 41 contains contact pieces 42 at the outer ends thereof (see FIGS. 5A–5C). A contact piece may be of the same type of material as is the sealing member 30 of the peripheral seal 26. Preferably, we employ a relatively rigid Teflon strip for the sealing member 30 employed with the peripheral seal 26 and a Teflon button 42 employed with the radial seal 37.

Figure 5A:
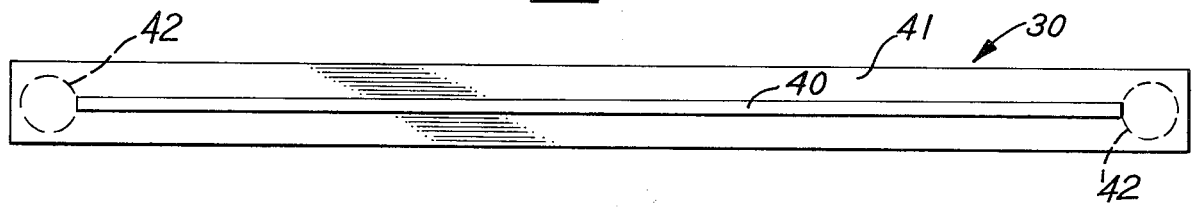
FIGS. 5A–5C show a top, plan and face view, respectively, of one embodiment of the sealing member for the radial seal in accordance with this invention.
Figure 5B:
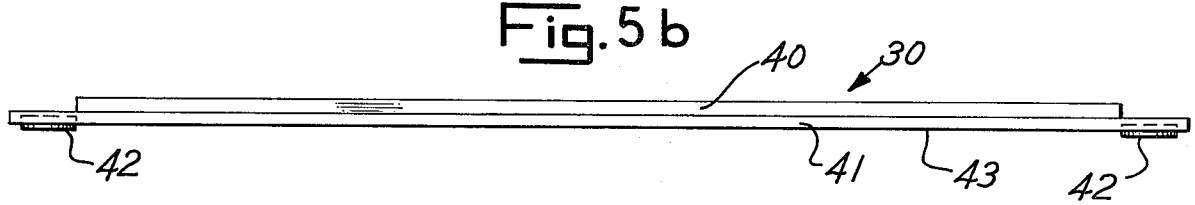
Figure 5C:
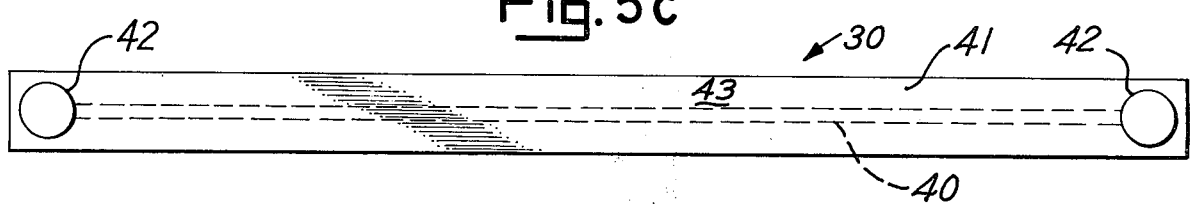
Figure 7:
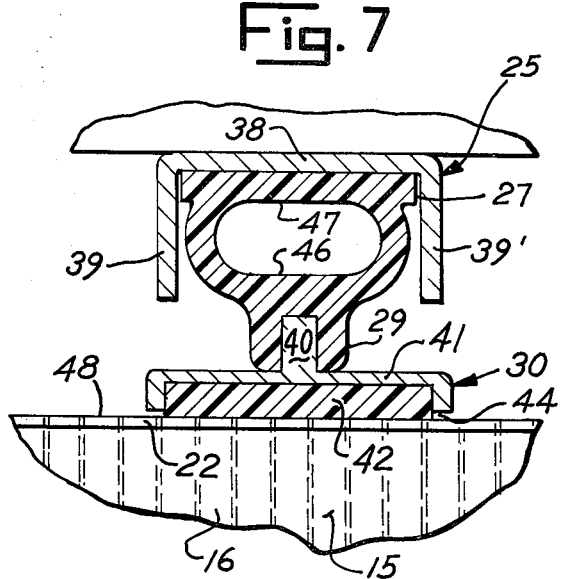
FIG. 7 shows a radial seal in operation in accordance with this invention.

The two buttons 42 as seen in FIGS. 5A–5C ride on the flanges 22, 24 of the wheel as seen in FIGS. 2 and 7. Because of the general configuration of this embodiment, we refer to the sealing member 30 of the radial seal 37 as a T-bar, but it should be understood that the configuration may be any desired configuration providing for a relatively wide, flat and straight web portion 41 disposed parallel to and spaced from the face of the wheel material 15.

As can be seen in FIGS. 4, 5B and 7, the contact piece or Teflon button 42 extends outwardly from the face 43 of the T-bar web 41. Referring to FIG. 4, the distance 44 between the face 43 of the web or plate of the T-bar, and the face 45 of the Teflon button 42 represents the maximum short circuit gap permitted by the radial seal of our invention. The Teflon contact pieces or buttons are placed firmly against the annular flanges 22 and 24 of the wheel, and the intermediate face 43 (see FIGS. 5C and 8) of the T-bar plate is thus a constant, predetermined small distance from the face of the wheel as it rotates. Since the seal is secured to or retained by the radial seal strut 25, which in turn is secured to the inner duct 3, the wheel is free to rotate with only slight frictional contact between the Teflon buttons 42 and the flanges 22 and 24. The low-friction nature of the contact pieces 42 provide case of rotation without vast frictional resistance heretofore characterized by radial seals.

A striking advantage of our invention lies in the fact that in addition to the low-friction characteristic of the contact piece 42, as it does wear, the short circuit gap 44 becomes smaller. This is in contrast to the short circuit gaps of prior types of seals which the gap increased as the seal material or core material was abraded. Radial seals heretofore have presented extremely unique problems in that wheel core material for absorbent types of wheels may be quite thin and fragile, or quite thin and sharp edged for metal heat exchange wheels. A flexible flapper type of seal, which is soft enough not to injure the core material of absorbent wheels and not be shredded by the metal or ceramic-type structure of heat exchange wheels, would be too flexible and resilient to resist lifting and being blown aside by pressure differentials in the incoming and outgoing streams 8 and 10. However, our rigid bar material 41, preferably made of an aluminum or other lightweight metal, remains rigid yet very closely spaced from the wheel. Since the entire T-bar rides with any wobble or misalignment of the wheel, the gap 44 remains constant or narrows slightly with the wear lifetime of the contact piece 42. In addition, it can be appreciated that the contact piece 42 may be easily removed and replaced with wear. The same is true of the contact piece 30 in the peripheral seal 26.

Figure 6:
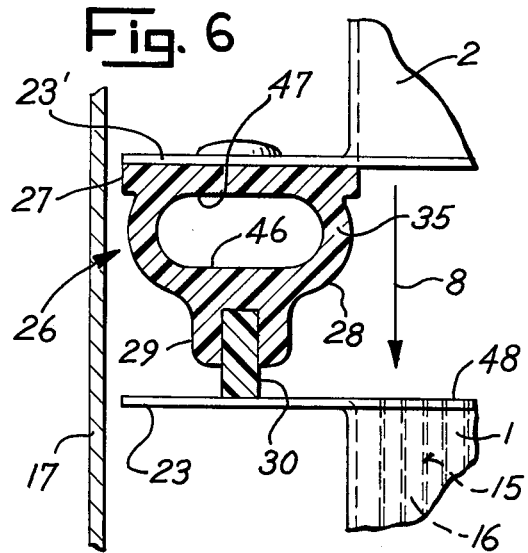
FIG. 6 shows, partly in section, a view of a peripheral seal in accordance with this invention in use.

In operation, the peripheral seal is seen in FIG. 6. Outer duct 2 on flange 23' carries the peripheral seal 26. The duct 2 is placed sufficiently close to the wheel 1 so that the peripheral seal intermediate portion 28 is flexed with the webs 35 being distorted out of round into a more generally oval shpe. The duct 2 and wheel 1 are not placed so close together that the inner face 46 of the flange portion 29 touches the inner face 47 of base portion 27. This partial flexing permits additional compression of the intermediate portion 28 should flange 23 of wheel 1 more closely approach flange 23' of duct 2 due to axial misalignment of the rotating wheel, or outward flexing should flange 23 recede from flange 23'. In addition, the radial width of flange 23 is substantial as compared to the width of the sealing member 30 so that substantial out of roundness may be compensated for while the sealing member 30 remains in continuous contact with the face of flange 23.

FIG. 7 shows the similar principle in operation for the radial seal. In the case, however, the buttons 42 remain in contact with the inner annular flange 22 and the outer annular flange 24 while the intermediate web portion 41 of the T-bar retains its critical spacing from the face 48 of the wheel material. At the same time, the channel sides 39, 39' permit some lateral flexing yet firm retention of the radial seal to compensate for out-of-roundness of the wheel while the flexing of the intermediate web portion 28 provides for axial misalignment. The two point contact of buttons 42 with the annular flanges 22 and 24 permits the seal to "follow" the seal throughout whatever rotational misalignmemts may occur. The action of both seals is thus best described as floating insofar as they provide for sealing, yet compensate for wheel irregularities.

Figure 8:
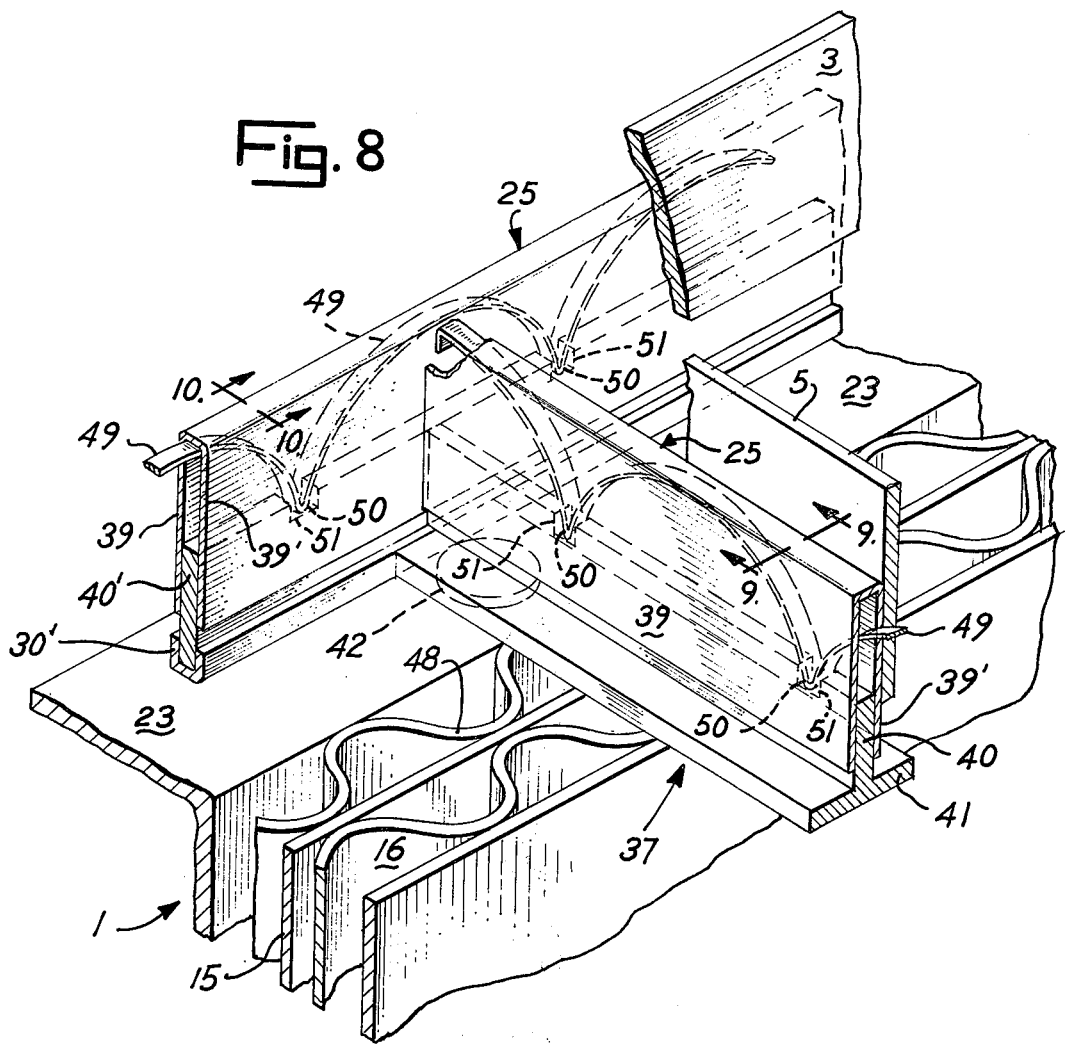
FIG. 8 is a perspective view, partly in section, of another embodiment of the invention and showing one mode of intersection of the peripheral, and radial seals.
Figure 9:
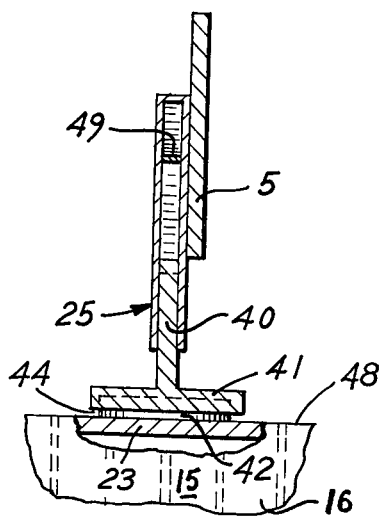
FIG. 9 is a section view along lines 9—9 of FIG. 8 of the radial seal.
Figure 10:
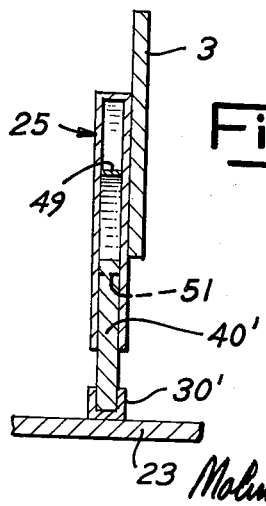
FIG. 10 is a section view along lines 10—10 of FIG. 8 of the peripheral seal.

FIGS. 8–10 show another embodiment of the invention employing a bow spring for the distance compensating member. FIG. 8 also shows one manner of joining the radial and peripheral seals at their intersection. The radial seal 37 employs the U-shaped channel 25 affixed to a baffle 5, both of which are shown partly broken away. Disposed therein is the T-bar assembly 40–42. Rib 40 rides within the channel and the contact piece 42 rides on the flange 23 of the wheel 1. The axial distance compensation is achieved in this instance by a ribbon-like bow spring 49 which rides inside the channel 25. The bow spring has sharp bends 50 which are received in notches 51 in the rib 40 of the T-bar. Similarly, the bow spring is used to force the sealing member 30' of the peripheral seal 26 into contact with the flange 23. The peripheral bow spring bends 50 are received into notches 51 in the rib member 40' of the peripheral seal. As best seen in FIG. 10, the sealing member 30' is U-shaped and adapted to fit snugly and securely over the rib 40'.

It should be understood that many variations within the spirit of the invention may be made without altering the scope thereof. For example, the particular base, intermediate web, flange and sealing members may be redesigned within the skill of the art without departing from the spirit and scope of this invention. For example, the peripheral seals may be supported from flanges rather than flanges attached to the duct. Likewise, the peripheral seals may be arranged to contact the outer cylindrical face of the wheel rather than a flange depending therefrom.

I claim:

1. An improved seal assembly for use with an imprecisely fabricated apparatus to continuously seal a gap between spaced fixed and rotating members comprising, in combination:
   a. an integral self-energizing resilient member including a generally planar base portion for sealingly securing said seal assembly to one of said members, an intermediate hollow, tubular portion connected to said base portion and elastically flexible in response to any irregularity arising from the movement of said members relative to each other, and a seal gripping portion including a pair of gripping lips, said gripping portion connected to said hollow tubular portion; and
   b. a sealing member removably secured to said resilient member by said gripping lips, said sealing member comprised of a relatively low friction material adapted for contact with the other of said members, said hollow tubular portion of said resilient member biasing said sealing member against said other member, whereby said seal assembly compensates for axial and planar misalignment and out-of-roundness of said members relative to one another and said sealing member continuously engages said other member.

2. The improved seal assembly of claim 1 wherein said intermediate hollow tubular portion of said resilient member is round.

3. The improved seal assembly of claim 1 wherein said relatively low friction material adapted for contact with said other member is selected from polytetrafluorethylene, chlorotrifluorethylene and polyethylene.

4. The improved seal assembly of claim 1 wherein said gripping lips are substantially parallel and extend from the side of said tubular portion opposite the connection to said base portion.

5. The improved seal assembly of claim 1 wherein said resilient member is silicone rubber.

* * * * *